Ralph D. Hasenbalg,
Kenji Watanabe,
INVENTORS.
BY.

ATTORNEYS.

May 26, 1970 KENJI WATANABE ET AL 3,514,759

CONTROLLED GAIN PLAYBACK LOOP FOR DATA ACQUISITION SYSTEM

Filed June 16, 1967 9 Sheets-Sheet 4

May 26, 1970 KENJI WATANABE ET AL 3,514,759

CONTROLLED GAIN PLAYBACK LOOP FOR DATA ACQUISITION SYSTEM

Filed June 16, 1967 9 Sheets-Sheet 9

United States Patent Office 3,514,759

Patented May 26, 1970

3,514,759

CONTROLLED GAIN PLAYBACK LOOP FOR DATA ACQUISITION SYSTEM

Kenji Watanabe, Los Angeles, and Ralph D. Hasenbalg, Santa Susana, Calif., assignors, by mesne assignments, to Digital Data Systems, Inc., Houston, Tex.

Filed June 16, 1967, Ser. No. 657,454
Int. Cl. G06f 7/00
U.S. Cl. 340—172.5 11 Claims

ABSTRACT OF THE DISCLOSURE

A Data Acquisition System is described which is adapted to measure and record signals whose amplitude ranges over several orders of magnitude and which are to be recorded ultimately in digital form with scale and magnitude digits. A playback system is disclosed which is responsive to the recorded scale digit signals to generate a smoothed output signal of substantially constant signal envelope, without discontinuities, resulting from discrete changes of gain.

This invention relates to data acquisition systems, generally, and more particularly to a broad range, seismic data acquisition system, which provides a digital output for recordation and subsequent playback.

In the field of data acquisition generally, systems are required which can process low level electrical analog signals and, in real time, generate a record which can be of sufficiently high accuracy and resolution for subsequent computer analysis of the information obtained. Present systems are available, which include sensitive transducers to convert the basic information into electrical analog signals, which may be recorded as such. However, it has been deemed preferable to convert the electrical analog signals into a digital form and to record the information as digital data in a recording system compatible with digital information handling systems.

The problems inherent in producing such data acquisition systems, generally, and seismic data systems, particularly, reside in the gain capability of analog amplifiers, the rate at which the input signal changes magnitude, and the cost and expense of amplifiers whose gain characteristics are uniform, over a wide range of amplification, both for recordation and for playback.

Typical prior art digital seismic recording systems have been disclosed in the prior patents to, for example, R. J. Loofbourrow, No. 3,241,100, issued Mar. 15, 1966, or the British patent to Jersey Production Research Company, No. 978,171, published Dec. 16, 1964. Still other systems are described, for example, in the papers presented to a meeting of the Society of Exploration Geophysicists in November of 1965, which included descriptions of digitally controled seismic amplifiers.

One such system, for example, is described in Paper G–12 of that meeting by Paul Sherer and Lorenz Shock, which includes an automatic gain ranging amplifier. Each "channel" includes a pair of alternately energizable, variable gain amplifiers, each with two gain settings that are alternatively selected. The output of the selected amplifier is applied to a multiplexer. A time shared, analog-to-digital converter, is provided with a third amplifier, at the input, that is settable to one of four gain levels. Obviously, any noise introduced in the multiplexer is amplified before the analog-to-digital conversion step and is therefore digitized.

In the Loofbourrow patent, there is taught a plurality of amplifiers in series, each with fixed gain. Maximum gain is achieved if all amplifiers are connected. It is possible to select an output from any one of the amplifiers, for lesser amounts of gain. With a plurality of amplifiers, noise in the earlier stages is amplified, together with the analog information signal.

Yet other systems have been devised which, prior to the analog-to-digital conversion step, amplified the analog signal using an amplifier system whose gain is variable in discrete, incremental steps. Incremental changes of gain may have binary significance, decimal significance or, in other embodiments, and depending upon the apparatus employed, significance in systems of yet other numerical bases.

During the acquisition and recordation of information, it is important not only that the magnitude of the amplified signal be accurately represented in digital terms, but that the magnitude of the gain employed also be recorded as a "scaling factor," which affects the actual magnitude of the digital signal. This information, suitably recorded, is necessary to provide an accurate representation of the data recorded.

It is frequently desirable to "play back" the recorded digital data to determine if the data acquisition equipment is functioning properly and if the adjustments which can be made, have been optimized. A graphic record is usually most convenient for an operator of the equipment. If gain has changed in incremental steps, there can be discontinuities in the record at those values where the gain has increased or decreased.

In seismic data systems, as a prime example of a data acquisition system, the input signals may range in magnitude from 1 microvolt to 100 millivolts. Precise and accurate amplification is required over the full scale which can represent five orders of magnitude. Further, for accurate playback, an amplifier of substantially similar range capability would be required to transform the digital data into its corresponding, analog curve.

Some known systems on playback utilize both the recorded scale and magnitude digits. Other systems use only the magnitude digits to provide an analog signal whose range, accuracy and resolution is adequate for most graphic recording devices. The graphical record produced in the first case would normally have a relatively flattened envelope but would include discontinuities or signal inaccuracies at those points in the curve where a change in gain took place. If the magnitude digits alone were used, the resultant trace would be a series of discontinuous curves, all within the range of the output device.

The original data generated from the transducers is a series of impulses superimposed upon a decaying analog signal. For visual display purposes, the representation of the recorded signal should recover the impulses as faithfully as possible, no matter how attenuated the signal.

In the prior art systems that utilize the scale digits, a variable gain output amplifier attenuates or reduces the gain of the amplifier, in accordance with the scale digits. The digits representing maximum gain produce maximum attenuation and suitable circuits "smooth" the output at the points of gain change.

According to the present invention, there is provided within a data acquisition system, a plurality of improved, digitally controlled amplifiers, each operating through a dynamic range as great as 72 db (6 db representing a gain change by a factor of 2). A multiplexer applies the output of each amplifier to a suitable, time shared analog-to-digital conversion circuit, which generates a digital signal of fifteen binary digit resolution. The digital signal is then recorded, together with scale or gain information which has also been transmitted through the multiplexer.

In an improved playback circuit, the recorded digital information is applied to an appropriate digital-to-analog conversion system and the resulting analog signal is applied to a novel amplifier-filter system of limited gain capability, which is nonetheless adequate to generate an output to an appropriate graphic display device.

The improved digital gain amplifier of the present invention is capable of a gain range of $2^{12}$ in discrete, binary steps for a maximum gain of 4096 to 1. A 4-bit binary counter is used, both to control the gain of the amplifier and to provide to the recording device, information as to the gain setting of the amplifier at any time. One preferred method of recording scale information has been disclosed in the copending application of Block and Alexakis, Ser. No. 550,240, filed May 16, 1966, which teaches the use of single bits representing increments of gain.

In response to the digital scale information available on playback in an automatic gain control loop, the amplifier-filter system either doubles or halves the magnitude of the analog signal, in accordance with gain change information. This arrangement permits a substantial relaxation of the gain requirements of the circuits which control the graphic display device.

The data acquisition system, over all, is arranged in a plurality of subsystems. An Amplifier Subsystem includes a plurality of individual data channels, each of which is connected to receive an input signal. The input information signal is applied through a selectable gain amplifier, adjustable filters, and a binary variable gain amplifier, the output of which is applied to a multiplex device which on a sequential basis, applies the signal of each channel to a Digital Recording subsystem.

In the preferred embodiment, the variable gain amplifier is mechanized as a pair of serially connected, multiple gain amplifiers. The first amplifier of the pair has three gain settings, corresponding to amplifying factors or gains of 1, 16, and 256. The second amplifier may have as many as five gain settings respectively corresponding to gains of 1, 2, 4, 8 and 16. By selecting one gain value for each of the amplifiers, the combination can provide, in binary steps, an overall total gain of from 1 through 4,096. If the settling time requirements for the amplifier system are stringent, only four of the gain settings are used in the second amplifier. The variable gain feature is achieved by providing an operational amplifier with a variable resistance feedback loop. By a novel combination of switching elements, the output of the amplifier is selectively applied to one of the serially connected resistors in the closed gain loop. For unity gain, only a predetermined resistance is provided. For greater gain, the resistive impedance is incrementally increased by a factor of 2. With precision resistors, better than .1% accuracy is achievable from the combination.

For playback purposes, a plurality of playback channels, each corresponding to an input channel is provided. Each channel includes an improved, gain-changing amplifier, which operates over a limited dynamic range. The amplifier responds directly to recorded scale or gain increments and is limited to gain changes of $2^1$ or $2^{-1}$. Signals, representing increments of gain change, are applied to a gain control element to select the appropriate gain setting. A capacitor filters and holds the output of the circuit and switching elements periodically decouple the capacitor from the circuits.

The operation is best described in terms of an automatic gain control system. The analog voltage input representing the magnitude (but not to scale) of the recorded signal is applied to a controlled gain amplifier of limited gain range. Signals are periodically applied to the output filter for a continuous, linear output. A gain detector operates in response to signals indicating a gain change to increase or decrease the gain of the variable gain amplifier by a factor of 2. Since the binary increments of gain are known in advance, they can be applied to the system at a time when the output filter is decoupled from the system.

The continuous modification of the gain enables a presentation of the information representing signal perturbations at a magnitude useful for display purposes. While it is important to have the discontinuities of gain change visible to confirm that the gain is being changed during the recording operation. On subsequent playback, it is preferable to "remove" the gain change discontinuities and all perturbations can be displayed with similar amplitude. The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

FIG. 1 is a block diagram of a Data Acquisition System of a type in which the present invention is useful;

FIG. 2, including FIGS. 2*a* and 2*b*, is a block diagram of the Data Acquisition System of FIG. 1, as it is connected for Recording (FIG. 2*a*) and for Playback (FIG. 2*b*);

Figure 1:
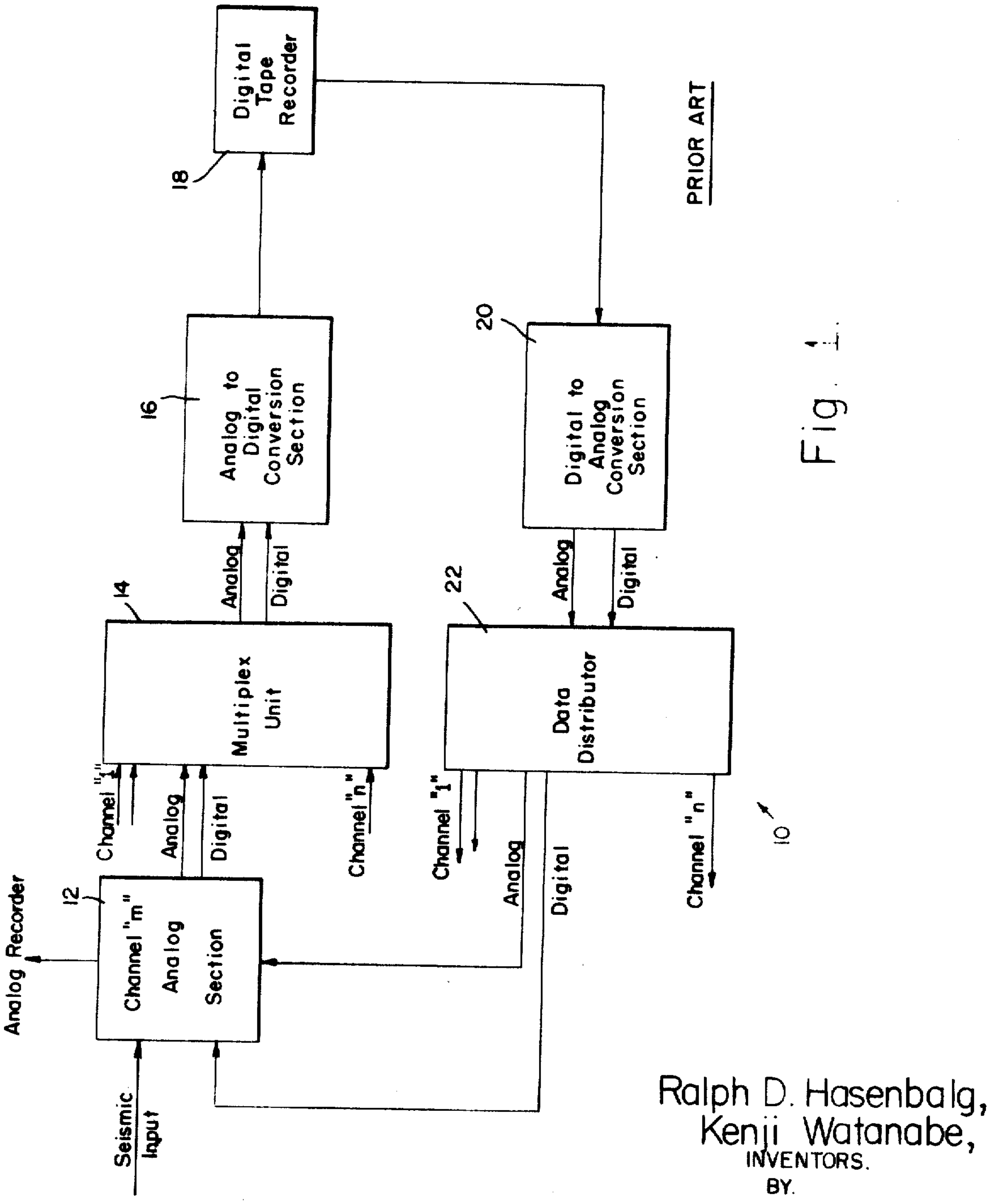

Turning first to FIG. 1, there is shown, in block diagram, a Data Acquisition System 10 such as is useful in the recording of seismic data. The System 10 is shown in terms of its main functional blocks. A plurality of channels is provided, for the independent acquisition of data from different transducers. Shown in FIG. 1 is an Analog Section designated Channel "*m*" 12, which is typical of the "*n*" channels that serve the System. The Channel "*m*" Analog Section 12 provides both analog and digital outputs to a Multiplex unit 14 which is connected to each of the Channels to apply, in sequential fashion, the input information to an Analog to Digital Conversion Section 16. As illustrated, both a digital signal and an analog signal is provided to the conversion section 16. The output of the Analog to Digital Conversion Section 16 is wholly digital and is applied to a Digital Tape Recorder 18 for recordation and storage. The Tape Recorder 18 has reading as well as recording circuits and is adapted to play back the digital data, either for immediate verification of the information, or for a subsequent reconstruction of the applied input signal. The output of the Digital Tape Recorder 18 is applied to a Digital to Analog Conversion Section 20 which generates and applies both a digital and an analog signal to a Data Distributor Unit 22. The output of the Digital to Analog Conversion Section 20 is serially applied to each of the "*n*" Channels including, as shown, the Channel "*m*" Analog Section 12.

Figure 2A:
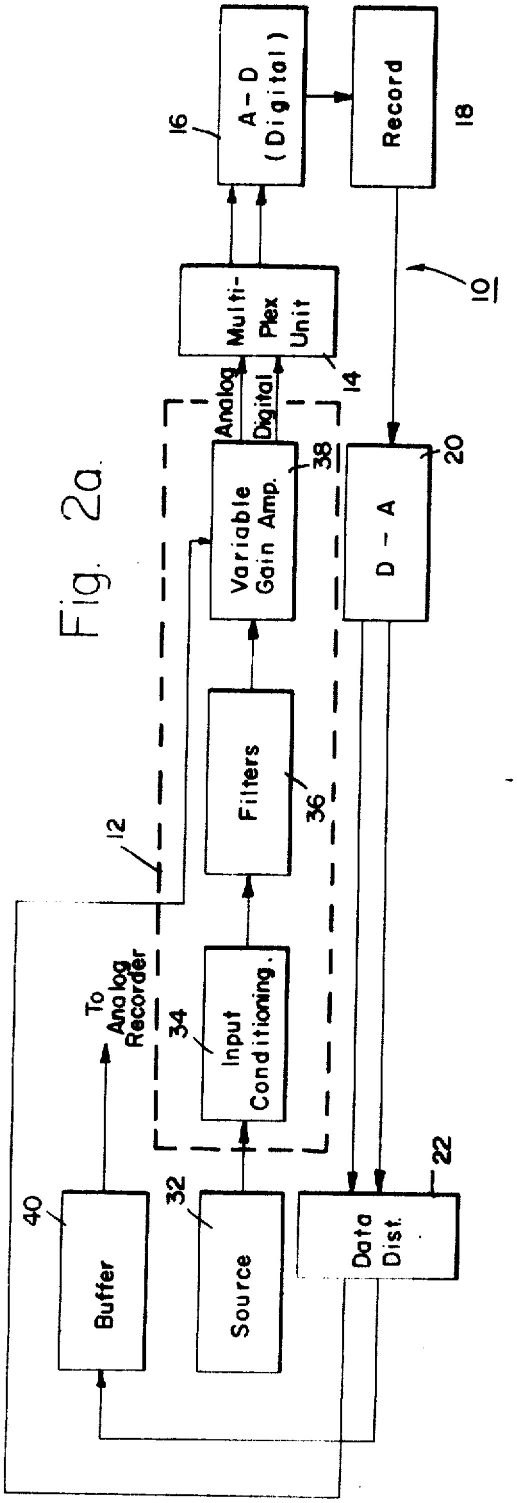
Figure 2B:
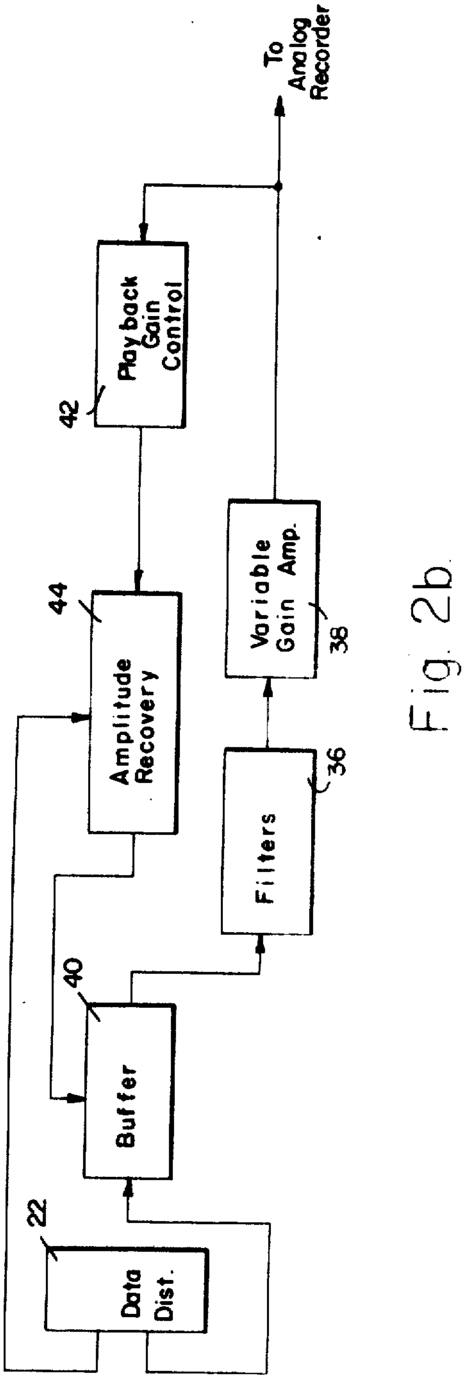

In FIG. 2, comprising FIGS. 2*a* and 2*b*, there are shown in functional block diagrams, the operational interconnections of the System 10, both in the Recording Mode of operation (FIG. 2*a*) and in the Playback Mode of operation (FIG. 2*b*).

Turning first to FIG. 2*a*, the System 10, when in the Recording Mode, initially receives signals from an external analog source 32. These signals, which may be seismic input signals, are applied to an Input Conditioning portion 34 of the Channel "*m*" Analog Section 12. The Input Conditioning Portion 34 applies signals to a Filter Section 36, which removes undesired frequency components from the applied signal. The output of the Filter Circuits 36 is applied to a Variable Gain Amplifier Section 38. The Variable Gain Amplifier Section generates amplified analog signals, and digital signals representing gain which are applied to the Multiplex unit 14. Feed back signals from the Analog to Digital Converter Section 16 are applied through the Data Distributor 22 to control the gain of the Variable Gain Amplifier Section 38.

For monitoring purposes, a limited playback capability is provided in the Recording Mode, and, for this purpose, the Data Distributor 22 applies signals to a Buffer Amplifier 40 whose analog output is applied to an analog recording device (not shown).

In the Playback Mode of operation, as shown in FIG. 2*b*, the configuration is changed somewhat. The Data Distributor 22 applies an analog signal to the buffer amplifier 40 which in turn is connected through the filter circuit 36 and the Variable Gain Amplifier Section 38. For this Mode, the Variable Gain Amplifier Section 38 is preset at a fixed gain level, which, in the preferred embodiments, is unity. The output of the Variable Gain Amplifier Section 38 is applied to the analog recording device (not shown).

The output of the Variable Gain Amplifier Section 38 is also applied to a playback Gain Control Circuit 42, the output of which is applied to an Amplitude Recovery Circuit 44. The digital output signal of the Data Distributor 22 is also applied to the Amplitude Recovery Circuit 44 which applies an additional input to the Buffer 40.

Since the Data Distributor 22 sequentially applies input to each of the Channels, the second input to the Buffer 40 from the Amplitude Recovery Circuit 44 is necessary to assure a substantially continuous signal to the analog recorder. The combination of the Playback Gain Control Circuit 42 and the Amplitude Recovery Circuit 44 permits a reconstruction of the analog signal whose scale and magnitude is represented by the recorded digital information. As will be explained below, the Amplitude Recovery Circuit 44 compensates for the amplifier gain changes which were recorded as gain increments and smooths the analog data curve, removing from the signal any discontinuities which would otherwise be introduced by the abrupt and incremental changes in gain. However, the signal perturbations, which in a seismic system, represent echoes of the initial "bang," are presented at a substantially constant amplitude, no matter how attenuated the received signal has become. Since the later signals correspond to greater distances, it is important that such later "echoes" be presented with a fidelity comparable to that of the relatively early "echoes," which have not been as greatly attenuated.

Although in FIG. 2*a*, a variable gain amplifier 38 and a buffer 40 function in that manner on recording, for the playback operation, as shown in FIG. 2*b*, the variable gain amplifier 38 is connected to operate as a buffer amplifier and the buffer 40 operates as a variable gain device. In the preferred embodiment, as described below, the circuit element described as the variable gain amplifier 38 is capable of both operations as is the circuit which, for convenience, has been denominated the buffer 40. However, it is to be understood that on playback, as shown in FIG. 2*b*, the variable gain amplifier 38 is performing a buffer amplifier function and the buffer 40 is performing a variable gain amplifier function.

Figure 3:
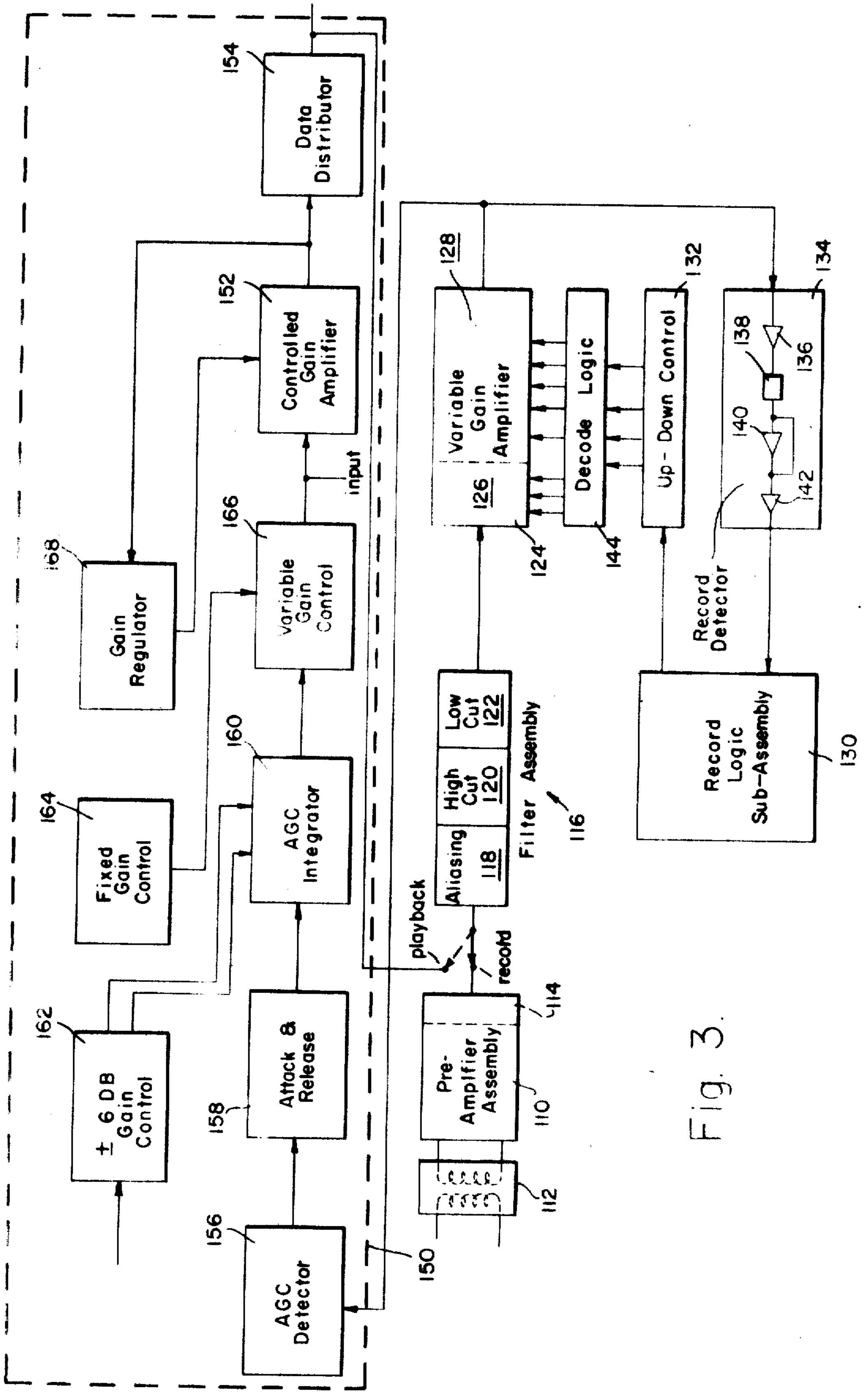
FIG. 3 is a block diagram of a Record and Playback system according to the present invention.

Turning now to FIG. 3, seismic signals from a geophone (not shown) are coupled into a preamplifier 110 through input transformer 112 where, in the preferred embodiment the signal level is stepped up by a factor of 20. The resultant signal is coupled into a high gain, low noise feedback amplifier 114. Basic gains of 1, 2, 4, and

8, selected by a front panel switch (not shown) provide signal gains of 20, 40, 80 and 160 through the preamplifier assembly 110. These levels correspond to front panel gain switch markings of 26, 32, 38 and 44 db (not shown). The preamplifier 110 is used only during the RECORD mode. The amplifier seismic signals are then coupled to a filter assembly 116.

Three signal conditioning functions are accomplished by the filter assembly 116, "aliasing," "high cut," and "low cut." An aliasing filter 118 is a 14-pole Butterworth circuit providing a roll off rate of 84 db per octave. Three frequency selections are provided for 1, 2 and 4 millisecond sampling rates, which correspond to 250, 125 and 62.5 c.p.s. respectively.

A high cut filter section 120 consists of two identical 3-pole Butterworth circuits. Each 3-pole section provides a roll off rate of 18 db per octave. Roll off rates of 18 db per octave or 36 db per octave are achieved by using either one 18 db section or cascading the two 18 db sections. Cutoff frequencies of 20, 24, 32, 40, 50, 64, 80, 100, 128 and 160 c.p.s., and an OUT position are selectable by a front panel switch (not shown).

A low cut filter 122 consists of two identical 3-pole high pass sections, each providing an 18 db per octave roll off rate. An 18 or 36 db per octave roll off rate is manually selectable by using one of the 18 db sections only or by cascading the two 18 db low cut sections. The cutoff frequencies which are selectable by a front panel switch (not shown) are 5, 8, 10, 12.4, 16, 20, 25, 32 and 40 c.p.s. As with the high cut section 120, an OUT position (not shown) is provided to remove the filter section entirely.

The output of the filter assembly 116 is coupled into a variable gain amplifier 124 which consists, in part, of two, cascaded, operational amplifier sections 126, 128.

The variable gain amplifier 124 is operated in conjunction with a Record Logic Subassembly 130. As explained in greater detail below, feedback resistors in the operational amplifier 124 are switched to different values for various gain changes. The resistors are selected using field-effect (FET) switches (described below) and are controlled by a 4-bit, Up-Down Counter 132, The counter 132 is controlled by gates in the Record Logic Subassembly 130. Gain settings from unity to 4096 are selectable in 6 db increments. For each "up" count of the counter 132, the gain increases by a factor of two; for a "down" count, the gain is reduced by one-half. The first operational amplifier section 126 has gain steps 1, 16 of 256; the second amplifier section 128 has gains of 1, 2, 4, 8 or 16.

The output of the variable gain amplifier 124 is connected to a Record Detector 134 which consists of a Buffer Amplifier 136, a Full Wave Detector 138, an Integrator Amplifier 140, and a Threshold Detector 142. The Threshold Detector 142 compares the DC level at the Integrator Amplifier 140 output with a reference voltage, which has been set for a predetermined threshold level. The DC output voltage of the Integrator Amplifier 140 responds proportionally to the average energy level of the seismic signal.

As the seismic signal decreases, the Integrator Amplifier 140 output increases in a relatively positive direction until the threshold value is reached, at which time the output of the Threshold Detector 142 goes from "FALSE" to "TRUE." This "TRUE" condition allows the Up-Down Counter 132 to change in the "up" direction by one increment. The "new" state of the Counter 132 is decoded by Decode Logic gates 144. The decoded count is coupled into FET driver circuits (not shown) which select a different value of a feedback resistor, thereby doubling the gain of the Amplifier 124 from the previous gain setting, corresponding to an increase of one in the Counter 132. The Record Detector 134 controls only gain increases as the amplitude of the applied signal decreases. Decrease in amplifier gain is controlled digitally from the A-D converter section 16 of the digital section, to prevent transient overload which could be caused by a sudden "burstout" of the signal amplitude.

Figure 4:
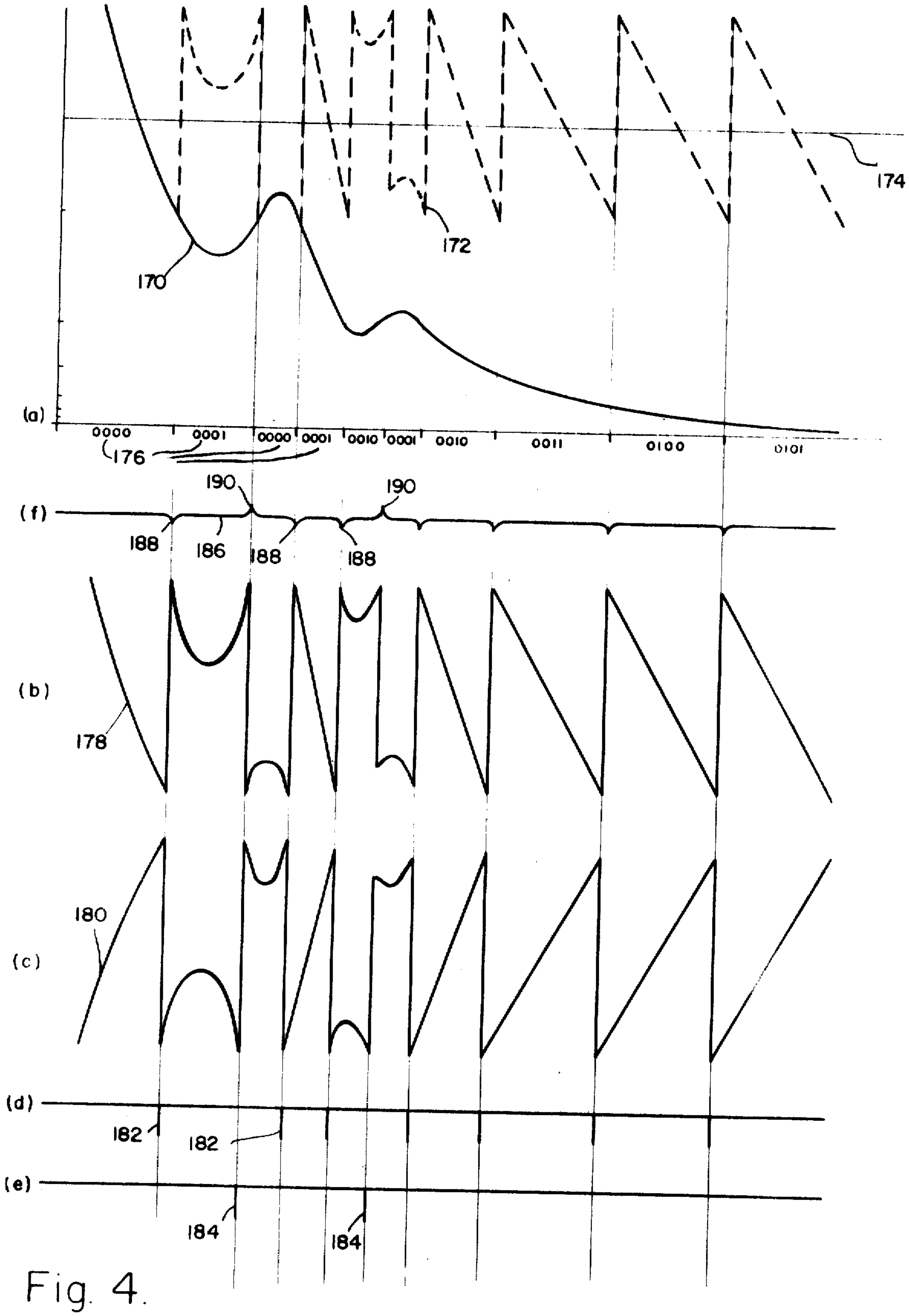
FIG. 4 is a series of graphs drawn to a common time base of signals processed by the present invention.

As shown in FIG. 4, described in greater detail below, the typical seismic envelope will rise abruptly at the first arrivals and then will descend in an exponential curve with time. The seismic signal usually lasts for approximately 6 seconds. At the maximum signal point of the envelope, the amplitudes can be in the order of a hundred millivolts RMS. At the end of the recording interval, however, the signals can decline to approximately 1 microvolt, RMS, or less.

The initial gain setting of the preamplifier 110 can be adjusted to a value dependent upon the signal strengths that are received for a given geological area. It is advantageous to set a "FIXED GAIN" switch to as high a gain as possible, but not to a level so high as to cause the preamplifier to be overdriven. For higher preamplifier gains, the signal to noise ratio is greatly improved, thereby allowing amplifications of very small signal amplitudes. The variable gain amplifier 124 is "preset" to a nominal gain setting, depending upon the signal levels which are expected to be present at the first arrival of seismic input signals after the "shot."

The function of the Record Logic subassembly 130 is to control the gain of the two variable gain amplifier sections 126, 128, within the Sesimic Amplifier 124. The actual control to these amplifiers 126, 128 is via eight lines which are the decoded outputs of the four flip-flops wdhich comprise the Up-Down Counter 132 and the 16 decoded logic gates 144. These lines are designated the 1, 16 and 256 gain control lines which are applied to the first amplifier 126, and the 1, 2, 4, 8, and 16 gain control lines which are applied to the second amplifier 128.

The Record Logic Subassembly 130 is synchronized to the digital system and is operated at either a 1 kc., a 500 c.p.s., or a 250 c.p.s. multiplexing rate. "End of conversion" pulses (E.O.C.) are supplied from the A–D converter 16 as a "clock" for the Record Logic Subassembly 130. A sequencer, located in the digital system, provides a Record Sequence signal to the several, individual "*n*" amplifier channels, thereby allocating a given time, within each scan to each of the amplifier channels.

The state of the Up-Down Counter 132 may be read via the four readout lines illustrated. The Counter 132 is capable of stepping "up" or stepping "down" one state at a time, or of being "forced" to a particular state by particular commands. When one of these commands is given, the Counter 132 will go to the state set by an "Early Gain Switch" (not shown) on the front panel. When another of the commands is given, the Counter 132 will go to the state determined by inputs from the digital system. When a third of the commands is given, the Counter will automatically go to its minimum, or Unity-gain state.

In order for an automatic incremental change to be made, various conditions must be met. First, the amplifier must have been "released" to make automatic changes.

The digital portion of the system detects when the A–D converter in the Analog to Digital Conversion Section 16 processes a signal from any amplifier which is greater than 1/16 of full scale. At this time a signal is set to that amplifier to "release" it. After a record has been started, the first signal greater than 1/16 of full scale, through each amplifier, will cause that amplifier to "release." In the event that, after a predetermined timed interval, any of the amplifiers have not had a signal representing an input greater than 1/16 scale, a timed release will be sent which will release all remaining amplifiers.

All automatic gain changes take place during the $m+2$ amplifier time interval. An amplifier $m$ is changed when amplifier $m+2$ has been addressed. This allows approximately one complete cycle, during which the amplifier gain settles, before the multiplexer is "looking" at the amplifier.

Logic circuits (not shown) impose several operating conditions that are here expressed in words. For example, an "UP SCAN" command must be present if an "Up" state change is to be made. Similarly, a "DOWN SCAN" command is present if the change is to be a "Down" state change. Further, the Counter 132 cannot make an "Up" state change if it is already in its maximum state, or a "Down" state change, if it is in its minimum state. A further condition is that an "Up" change or a "Down" change request command be present. The UP Change Request is the signal output of the Record Detection Circuit 132. The Down Change Request command is a signal from the A–D conversion section 16 that the A–D converter has exceeded ½ scale.

When all of these conditions have been met, the gain change will take place. The actual change in counter state will occur at the end of the $m+2$ scan interval. When a state change has taken place, an UP-DOWN CHANGE bit will be available to indicate the change during the $m$ interval in the following scan.

As shown in FIG. 4*a*, the output envelope or waveshape of the variable gain amplifier 124 is in the form of a sawtooth, with abrupt, 6 db changes, and is the input to the multiplex 14 and the Analog to Digital Conversion Circuits that are connected thereto. The state of the Up-Down Counter 132 is read out and is recorded along with the digitized analog signals so that gain information is coordinated with the signal information. The "fixed" gain setting of the preamplifier 110, is also recorded on tape.

The variable gain amplifier 124 provides gain changes of 6 db in 13 binary increments and ranges from a gain of unity to a maximum gain of 4096. In the seismic data embodiment, the input seismic signal level ranges from 100 millivolts RMS to 1 microvolt RMS, typically, which corresponds to a 100 db range. The variable gain amplifier 124 compresses this total range by 72 db. A 28 db range, which will descend upon reaching the maximum gain setting of the variable gain amplifier 124 can be accommodated in other parts of the system. The recorded signal, in digital form, together with the digital information representing the binary gain changes, can be processed by a digital computer directly, and the seismic information may be extracted.

A quick, "read-after-write" capability is provided to assure the operator that "valid" signals have been digitized and recorded. A mode of operating circuitry of FIGS. 2 and 3 provides this feature. The tape recorded information is played back through a separate, deformat sequencer and then into the D–A converter 20, which is applied through the Data Distributor 22 into the PLAYBACK input of the filter assembly 116. In the "Read-After-Write" mode of operation, a Playback subassembly 150, to be explained in greater detail below, is switched into "fixed gain" whereby a Controlled Gain Amplifier 152 serves as the Buffer amplifier 40 with a gain of 1. The output of the Controlled Gain Amplifier 152 is switched into a Data Distributor 154 which receives timing signals from a playback sequence control element in order to extract the data for a given channel. The output of the Data Distributor 154 is coupled into an analog display device driver buffer which, in a preferred embodiment, is a galvanometer-camera combination. The playback signal waveform will be identical to the waveform which was set to the multiplexer 14 (FIG. 4*a*).

When the system is operated in the regular Playback mode, the Playback Subassembly 150 performs gain corrections on the data, to maintain the output at a constant, average level, without discontinuities due to recorded gain changes. The correction consists of "inserting" incremental gain changes of 6 db to "cancel" the recorded gain change discontinuities, and then performing an automatic gain control (AGC) between successive "samples" on the resulting signal.

Since the dynamic gain range of the section of the amplifier 124 is 72 db, and seismic signals have a range of about 100 db, a greater range is needed. For computer processing, this additional range is covered by the dynamic range of the A–D conversion section 16. When playing signals back to an analog recording system such as a camera for example, the uncorrected AGC range of the Playback Assembly 150, which is 46 db, covers this additional range.

The Playback Assembly 150, on playback, is coupled to the Filters 116 and the Variable Gain Amplifier 124, which has been placed in a unity gain configuration. The output of the Variable Gain Amplifier 124 is applied to an AGC Detector 156, the output of which is applied to an Attack and Release Amplifier 158, which is adjustable to respond to the average energy content of the input information.

The output of the Attack and Release Amplifier 158 is applied to an AGC Integrator 160, which provides a voltage output that controls the gain of the system. In order to respond to the changes of amplitude which have required changes in the gain during recording, and which have been recorded as increments of gain, provision is made to either double or halve the gain in the playback system by either doubling or halving the voltage of the AGC Integrator 160. Since changing the gain by a factor of 2 corresponds to a 6 db change, an appropriate 6+DB Correction circuit 162 is provided to control the voltage on the AGC Integrator 160.

For added flexibility, the playback system can be operated in either a Fixed Gain Mode or a Variable Gain Mode and, accordingly, a Fixed Gain element 164 is provided in parallel with a Variable Gain Element 166. The output of the AGC Integrator 160, through the selected gain control element, is applied to the Controlled Gain Amplifier 152.

In order to keep the output envelope of the signal at an average reference level, a Gain Regulator 168 is included to compare the output with a predetermined control voltage. The error signal is then used to control the gain of the other elements. Specifically, the output of the Gain Regulator 168 is applied to the feed-back loop of the Control Gain Amplifier 152. These circuits will be explained in greater detail in connection with the figures described below.

The response of the present system to a seismic-type input signal is best illustrated by reference to FIG. 4, which includes a series of graphs, 4*a* through *f*, inclusive. The extent of the dynamic range of the available information is illustrated by the solid curve 170, in FIG. 4*a*, which represents the input envelope from the geophone, and which, in conventional applications, will range from a magnitude of 100 millivolts to 1 microvolt over the time interval of interest.

To resolve this information for visual display and computer analysis, the system described hereinabove is utilized. To facilitate accurate computer analysis of data, discrete gain steps are utilized in the amplifier, with each gain step being accurately known. The characteristics of the output envelope of such a discrete, gain-changing amplifier, operating with binary gain changes, is represented by the dashed curve 172, which corresponds to the input envelope 170. The straight line curve 174 represents an ideal envelope of the input signal for visual display purposes.

Along the base of the graphs, a series of binary digits 176 indicate, for each data sampling interval, the gain setting of the binary gain amplifier. For example, in the first interval, the legend "0000" represents a "0" gain in the amplifier. In the next interval, the gain has been doubled and accordingly, the gain setting is represented by "0001," or one gain increment. In successive intervals the gain setting is set forth representing in a binary code the scaling factor of the particular magnitude clue.

In FIG. 4*b* there is illustrated a typical signal envelope 178 which has been recovered from recorded binary digital data, through the use of suitable digital to analog data processing circuits. It will be understood that ideally the recovered curve 178 is substantially identical to the variable gain amplifier output 172 of FIG. 4*a* above. To compensate for a signal envelope 178 of the type normally recovered from the recorded digital data, an amplifier must have a gain characteristic as illustrated in the gain curve 180 of FIG. 4*c*. This will result in the desired ideal envelope 174 of FIG. 4*a* above.

In FIG. 4*f* there is drawn a composite graph, in which the information content of the negative going pulses of FIGS. 4*d* and 4*e* is presented on a single curve 186 as relatively negative excursions 188, representing gain increasing impulses and relatively positive excursions 190, representing gain decreasing impulses. The signal represented by the curve 186 of FIG. 4*f* could be applied to an UP-DOWN LOGIC unit 132 to drive the counter therein. The relatively negative impulses 188 could be recognized as "UP" counts to increase the count in the counter while the relatively positive impulses 190 would be recognized as "DOWN" counts to decrease the count in the counter.

In the present system, the gain loop of FIG. 3 is utilized.

As described above, the input signal is applied to the Controlled Gain Amplifier 152. The amplifier output is applied through the Filter Assembly 116 and the Variable Gain Amplifier 124 which is connected to drive the AGC Detector 156 and the Attack and Release Amplifier 158. The output of the Attack and Release Amplifier 158 is applied through the AGC Integrator 160 and into the Variable Gain Control circuits 166 to the Controlled Gain Amplifier 152.

In FIGS. 4*d* and 4*e*, there are shown curves that represent, respectively, by relatively negative impulses 182, 184 the exceeding of a predetermined limit, by the amplitude of the data curve, which event gives rise to a pulse which initiates a change of gain. The negative going pulses 182 signal that the magnitude of the signal has dropped below a limit and accordingly the amplifier gain must be increased. The negative going pulses 184 of FIG. 4*e* signals that the amplitude has increased above an upper limit and, accordingly, the amplifier gain must be decreased.

In the remaining drawings, there are set forth in circuit diagram, a preferred embodiment of the present invention. For ease in describing these circuits, and because of them any circuit elements to be identified, a reference numeral will be used to identify a particular circuit element without other distinguishing descriptive matter.

Figure 5:
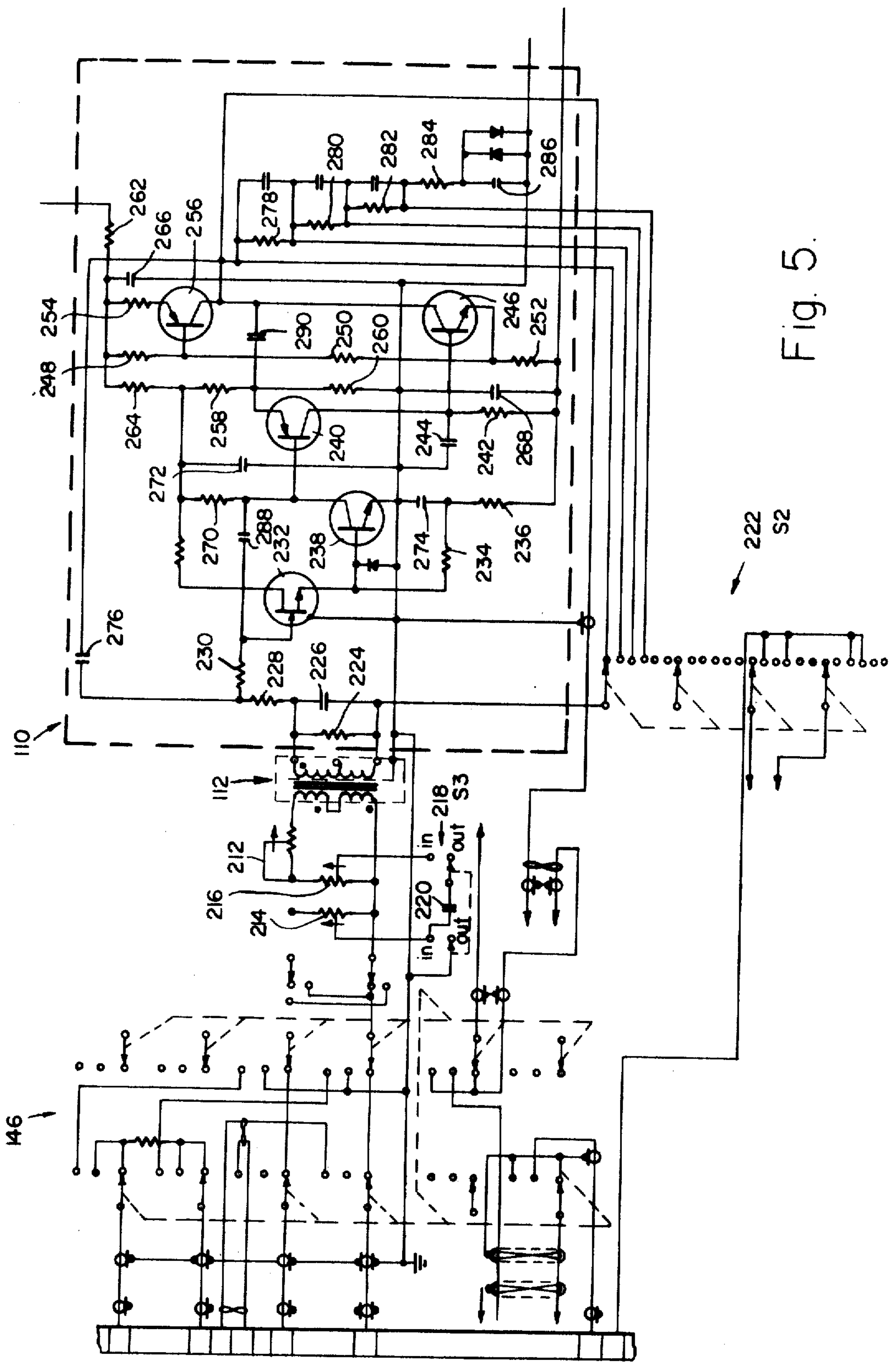
FIG. 5 is a circuit diagram of an input and preamplifier assembly useful in the present invention.

With reference again to FIG. 3 and also to FIG. 5, which is a circuit diagram of a seismic acquisition system according to preferred embodiment of the system 10, when a MODE Select switch 146 is set to an OPERATE position, the primary winding of the input transformer 112 of the *m*th channel is connected to a selected one of tthe geophone input lines. The secondary winding of the input transformer is connected to a preamplifier 110, the output of which is connected to the filter 116 input.

A gain adjustment resistor 212 is a 50 ohm, 25-turn Potentiometer. This control provides an overall preamplifier gain of 20 (26 db). Input line balance is accomplished by second and third potentiometers 214, 216 which are controlled by a front panel concentric knob and shaft arrangement not shown. An S3 toggle switch 218 is placed in the "IN" position, the wiper of the second potentiometer 214 is grounded and to provide resistive balancing. The wiper of the third potentiometer 216 is in series with a capacitor 220, to provide capacitive balancing. When switch S3, 218, is in the alternative or "OUT" position, both potentiometer wipers are open circuited.

A Fixed Gain select switch, S2, 222 controls the preamplifier basic gains of 1, 2, 4, and 8. With the gain of 20 provided through the transformer 112, the overall gains of the preamplifier 110 become 20, 40, 80 and 160, corresponding to fixed gain steps of 26, 32, 38 and 44 db, respectively, which are selectable from the front panel. A fixed gain readout (not shown) is provided so that the gain setting of the preamplifier 110 can be recorded.

The amplified geophone signal from the secondary of the transformer 112 which is developed across a resistor 224, a capacitor 226, and the divider network of a pair of resistors, 228, 230, is applied to the gate of Field Effect Transistor (FET) 232.

The transistor 232 is an N channel, silicon, field effect device selected for very low noise operation and connected in a source-follower configuration. Drain-to-source current is approximately one milliampere, as determined by the resistance values of resistors 234, 236. The output signal from FET 232 is directly coupled to the base of a grounded emitter, transistor 238. The output at the collector of transistor 238 is directly coupled to the base of an inverting transistor 240.

A collector load resistor 242 for transistor 240 together with a capacitor 244, provides a roll-off for stability. The signal at the collector of inverting transistor 240 is coupled to an output transistor 246. A series dividing network, including resistors 248, 250 and 252, provide emitter bias for output transistor 246 and a reference voltage for a constant current source, comprising resistor 254 and transistor 256. Emitter bias at inverting transistor 240 is accomplished by the divider network of resistors 258 and 260.

The power line coupling/decoupling path is through resistors 262 and 264 and capacitors 266 and 268. Additional decoupling is provided by resistor 270 and capacitors 272, 274. Preamplifier feedback is accomplished by the loop of a capacitor 276, resistor 278, primary of transformer 112 and a contact on S2 Switch 222, with actual gain controlled by the divider network of resistors 278, 280, 282 and 284 in series with capacitor 286 to signal ground.

A minor feedback from the collector of transistor 238 to the gate of FET 232 is provided by capacitor 288. Preamplifier stability is provided by the negative feedback from the collector of output transistor 246 through capacitor 290.

At unity gain, the output voltage offset generated by the gate-to-source voltage of FET 232 is approximately ±0.5 volt. This input-referred offset is not amplified for gains greater than "one" due to the action of capacitor 286 which presents a high impedance to D.C. signals. Therefore, the gain at D.C. is always unity for *any* setting of the S2 gain selector switch 222. For signal frequencies from 5 c.p.s. through the pass band of the preamplifier, capacitor 286 presents a low impedance. With signal ground in the circuit via this low impedance path, gain of the amplifier will be 1, 2, 4, or 8, as established by the selected resistance value in the divider circuit.

Figure 6:
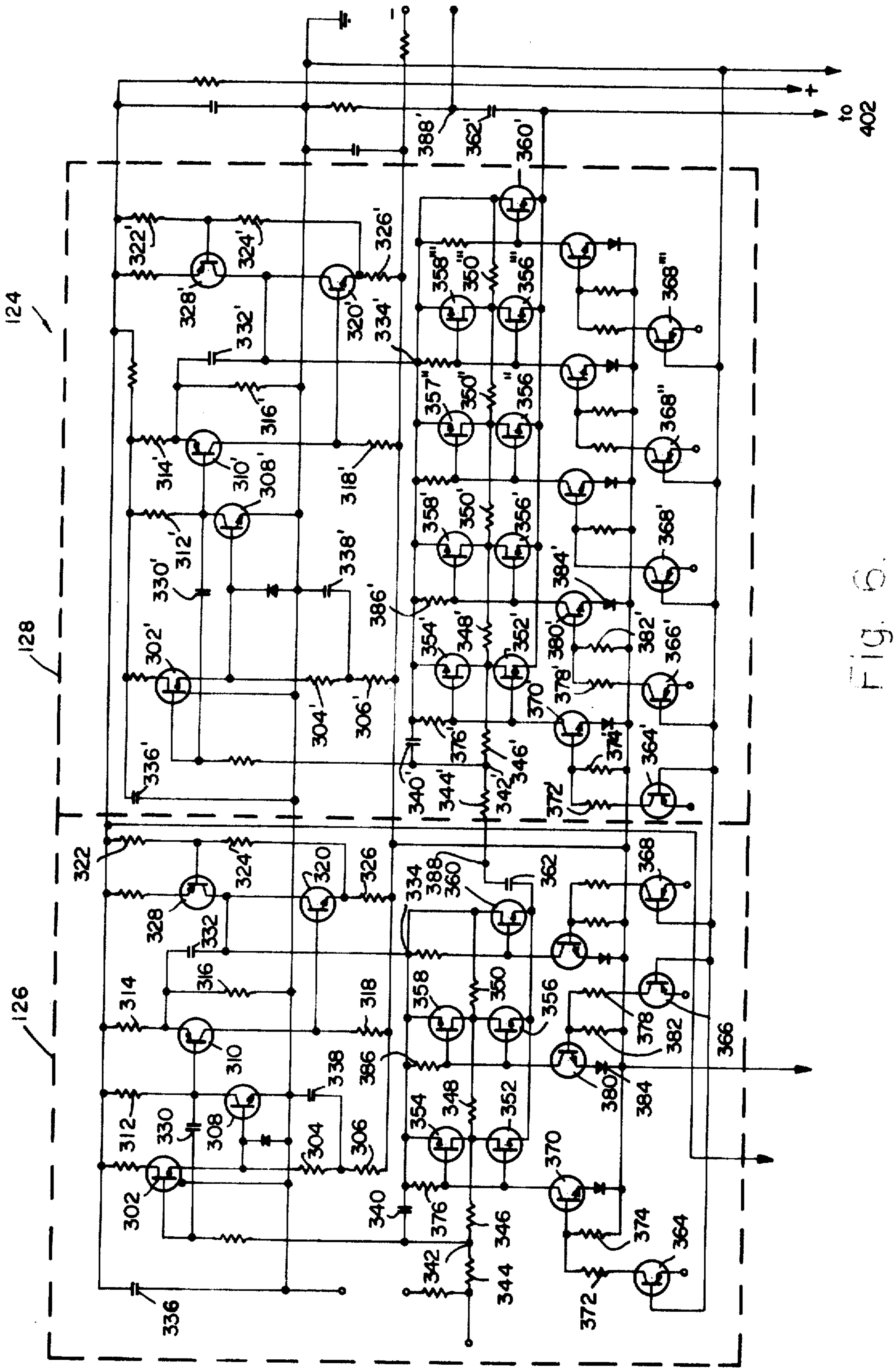
FIG. 6 is a circuit diagram of a binary gain amplifier useful in the present invention.

With reference to FIG. 6, which is a circuit diagram of a preferred embodiment of the Variable Gain Amplifier 124, it will be noted that the amplifier 124 is comprised of subcircuits, which are the substantially identical first and second Variable Gain Amplifier sections 126, 128. The Record Detector 134 section is shown in detail in FIG. 7. Because of the similarity of the first and second Amplifier Sections 126, 128, the description of the first section 126 shall be applicable to both. Similar reference numbers with primes have been used to distinguish the similar components of the second section 128. Any differences in the two circuits will be specially noted.

First Amplier Section 126 provides alternative gains of 1, 16 or 256, determined by the selecting circuits of the Record Logic Assembly 130. Gain steps available from the Second Section 128 include gains of 1, 2, 4, 8 and 16, also controlled by the Logic Assembly 130. Gain steps available from the Second Section 128 includes gains of 1, 2, 4, 8 and 16, also controlled by the Logic Assembly

130. The main differences in the two circuits are the impedance values of the feedback resistors and the number of stages of gain. The overall gain of the amplifier 124 is the product of the gains of the individual section.

The amplifier input is applied to an N channel, silicon, field-effect transistor, FET 302 which should be specially selected for low noise operation. The input stage operates in a source-follower configuration, with a high input impedance. The drain-to-source current is approximately one milliampere, as determined by the values of resistors 304 and 306.

The output of the source follower is connected directly to a grounded-emitter transistor 308. The output at the collector of transistor 308 is direct-coupled to the base of a transistor 310. Collector load for transistor 308 is a resistor 312.

Emitter bias for the transistor 310, is provided by the resistive divider combination of resistors 314 and 316. A resistor 318 supplies the collector load. The output of the transistor 310 is coupled to a transistor 320 which utilizes a resistive divider of the resistors 322, 324 and 326 for operating bias. This same resistor network provides a reference voltage for a constant current source transistor 328. A capacitor 330, provides a minor loop feedback path from the collector of transistor 308 to the gate FET 302 to provide a stable operating condition.

A capacitor 332 provides a negative feedback from the output terminal 334 of the amplifier to the emitter of the transistor 310. A decoupling filtering action for the input stage to the amplifier is provided by capacitors 336 and 338. A feedback capacitor 340 insures the proper "roll off" rate at the unity gain, crossover frequency.

The variable gain amplifier sections 126, 128 are connected in an operational amplifier configuration, with the summing node at the junction 342 of an input resistor 344 and a feedback resistor 346. For maximum gain of 256 in the first amplifier section 126, the total feedback resistance is equal to the sum of the values of the resistors 346, 348, and 350. A plurality of FET switches 352, 354, 356, and 358 are "cut off" during the high gain (256) mode. An output FET switch 360 is turned on, thereby connecting the amplifier output to a coupling capacitor 362.

When a gain of 16 is selected, the FET switches 356 and 358 are turned on and FET 360 is cut off. The FET switches 352 and 354 remain cut off. The drain-to-source resistance during conduction of a FET switch is approximately 300 ohms. The feedback resistor 348 is connected through the FET 358 switch resistance to the collectors of transistors 320 and 328.

The true output point of the amplifier section 126 becomes the commonly connected drain terminals of the switches 358 and 356. This output is coupled through the conductive resistance of the switch 356 to the coupling capacitor 362. The series resistance of the switch 358, during conduction, adds to the open loop output impedance of the amplifying stages.

In the unity gain operating condition, the FET switches 352 and 354 are turned "on" and the switches 356, 358, and 360 are cut "off." This condition provides a maximum total of feedback resistance. (The impedance of resistor 346 is added to the resistance of the conducting FET switch 354.) The transistors 364, 366, and 368 are operating in a grounded base configuration, and have their emitters connected to outputs of decoding gates (not shown) which are located in the Decode Dogic Section 144.

When a gain of unity or 1 is selected, the emitters of the transistors 366 and 368 are held at a positive potential, and the emitter of the transistor 364 is grounded through the decoding gates. This causes the transistor 364 to cut "off" thereby cutting off the transistor 370, due to loss of current through the resistors 372 and 374. With transistor 370 cut off, and the gates of the FET switches 352 and 354 coupled to the source of the switch 354 through the resistor 376, the switch 354 conducts and causes the drain of the FET switch 354 to assume the same potential as the source. This, in turn, places the drain of the FET switch 352, to the same potential as that of the source of the FET switch 354. Since the gate of the FET switch 352 is also coupled through the resistor 376 to the source of the FET switch 354 the zero drain-to-gate potential during this state of operation, therefore base current flows and causes the transistor 366 to saturate, allowing current to flow through the resistor 378 and into the base of the transistor 380 which is in parallel with a resistor 382. The resulting saturation of the transistor 380 connects the gate terminals of the FET switches 358 and 356 to the relatively negative potential line through the conduction of a diode 384, thereby causing FET switches 358 and 356 to be cut off.

At this time, the minimum gate-to-source voltage on the FET switch 358, can be approximately minus 10 volts and the maximum differential voltage from the gate to the source of the FET switch 358 could be approximately 30 volts. This is because the collectors of the transistors 328 and 320 may be varying from plus to minus 10 volts.

The input to the second amplifier section 128 is connected to receive the output of the first section 126, at the terminal 388. The signal input is applied through the input resistor 344' and the feedback resistor 346' which are connected at the summing node junction 342'. The impedance values of these resistors is not identical to that of their counterparts in the first amplifier section 126, but the function is the same. The differences in impedances are dictated solely by the magnitude of the gain to be achieved in the section.

The various feedback resistors also have values which are based upon the desired gain, and take into consideration the impedance values of the various semi-conductor elements which may be included in the feedback path. Functionally, however, the circuit of the second variable gain amplifier section 128 are substantially similar to those of the first amplifier section 126.

It will be noted that the second amplifier 128 contains two additional feedback resistor stages, to provide a choice of five different gain settings, whereas the first amplifier section 126 only provides a choice of three gain settings. Accordingly, the similar elements of the additional stages have been identified by appropriate reference numerals to which double primes and triple primes have been applied where appropriate. The output drive capabilities at the collectors of the transistor 328 and 320 are sufficient to provide current to flow through the resistor 386 into the relatively negative power supply. The output from the first amplifier section 126 is therefore taken from junction 388, following the capacitor 362.

Figure 7:
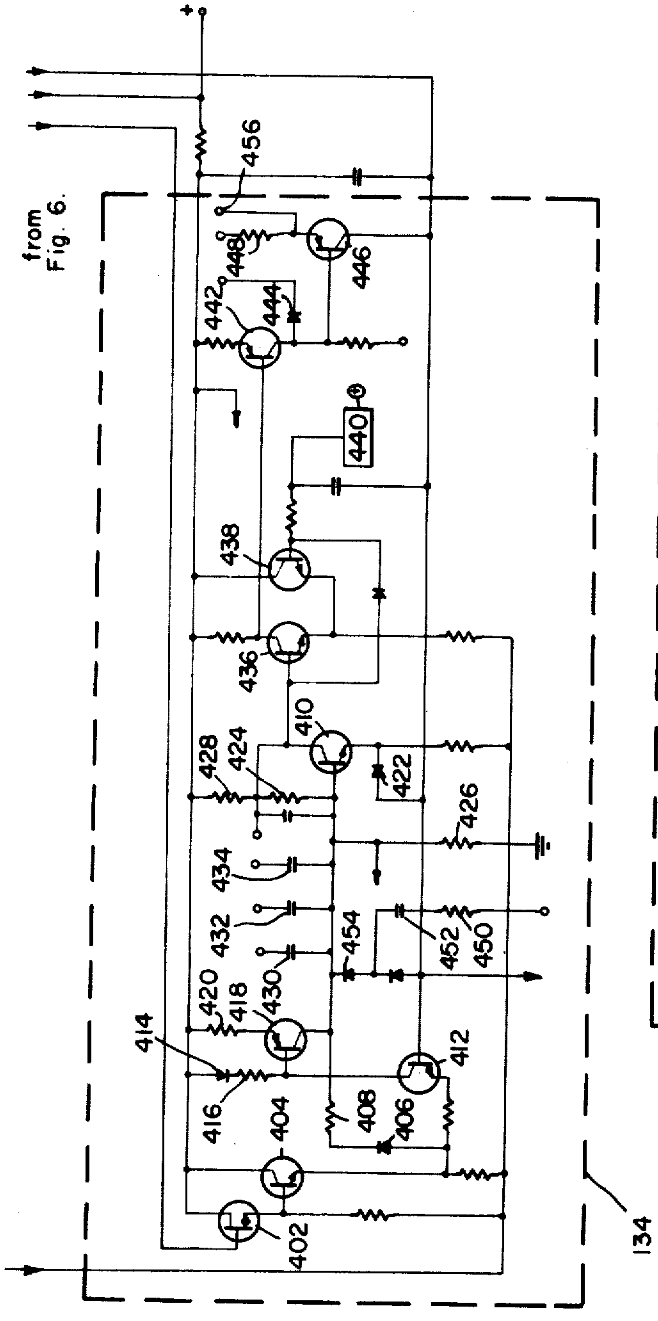
FIG. 7 is a circuit diagram of a Record Detector circuit useful in the present invention.

The Record Detector 134 is shown in detail in FIG. 7. An output from the Second Variable Gain Amplifier section 128 is taken from the output FET switch 360' and is coupled into the Record Detector 134 at the gate of a source follower buffer FET 402. The output at the source terminal of the FET 402 is further buffered by an emitter-follower transistor 404.

During the positive excursions of the output signal of the transistor 404, current is conducted through a rectifier diode 406 and a resistor 408 into the base of an integrator amplifier transistor 410. The positive signal at the emitter of a grounded base transistor 412 causes the transistor to cut off, thereby preventing current flow through a diode 414 and a resistor 416. This, in turn, keeps a transistor 418 cut off.

During the negative excursion of the output signal from the transistor 404, the transistor 412 is turned on, causing current to flow through the diode 414 and the resistor 416. The transistor 418 is forward biased and current flows through an emitter resistor 420 through the transistor 418 and into the base of the integrating amplifier transistor 410.

In the preferred embodiment, the emitter of the integrating amplifier transistor 410 is held at a 0.7 volt potential by the forward voltage drop across a diode 422. Since the base of the NPN transistor 410 must be +0.7 volt with respect to the emitter, the resultant operating potential at the base of the transistor 410 is equal to approximately 0 v. In the absence of a signal into the input buffer transistor 402, the collector quiescent potential of the integrator amplifier transistor 410 is held to approximately +10 v. which is determined by bias divider network consisting of the resistors 424 and 426. The collector load resistor for the integrating amplifier transistor 410 is a resistor 428.

When the input to the buffer amplifier increases, the magnitude of the full wave rectified positive output signal into the base of the integrating transistor 410 increases. The collector potential of the transistor 410 decreases from +10 v. to approximately the saturation voltage, which is near zero.

One of he several integrating capacitors 430, 432, 434 is selected by a front panel switch (not shown). The selected integrator capacitor is connected from the output of the integrator amplifier, the collector of the transistor 410 to the summing node of the amplifier, which is the base of the transistor 410. The output level from the integrator is coupled into the base of a transistor 436 which, together with a transistor 438, forms a differential amplifier configuration.

A resistive network 440 provides a positive reference voltage to the base of the transistor 438 and the collector of the transistor 436 is directly coupled in to the base of a transistor 442, which is a grounded-emitter gain stage. This circuit configuration provides a gain greater than 1000 from the base of the transistor 436 to the collector of the transistor 442. Therefore, when the quiescent D.C. potential at the base of the transistor 436 rises in a positive direction and exceeds the threshold reference voltage, the collector of the transistor 442 assumes a positive potential which is clamped to a 5.0 v. level by the diode 444. The output at the collector of the transistor 442 is then coupled into an emitter follower stage consisting of the transistor 446 and the emitter resistor 448.

When the output of the variable gain amplifier 124 decreases to a value equal to the threshold voltage, which has been established by the divider networks, the output from the emitter of the transistor 446 goes positive. This in turn enables the UP-DOWN COUNTER 132 to count "up" one bit, causing the variable gain amplifier 124 to double its gain from the previous gain setting.

At the instant the Counter 132 changes state, a short duration, positive going pulse is coupled into an R–C network consisting of the resistor 450 and the capacitor 452. This causes a small amount of current to be coupled through the diode 454 into the input node of the integrating amplifier including the transistor 410. The collector potential of the transistor 410 drops below the reference threshold voltage abruptly causing the RECORD Detector level output terminal 450 to go into a "false" condition, thereby preventing more than one gain Change from occurring. As pointed out above, all the "down" counts are initiated by signals from the upper stages of the A–D converter in the A–D unit 16, which signals are applied to the Record Logic Subassembly 130.

Figure 8:
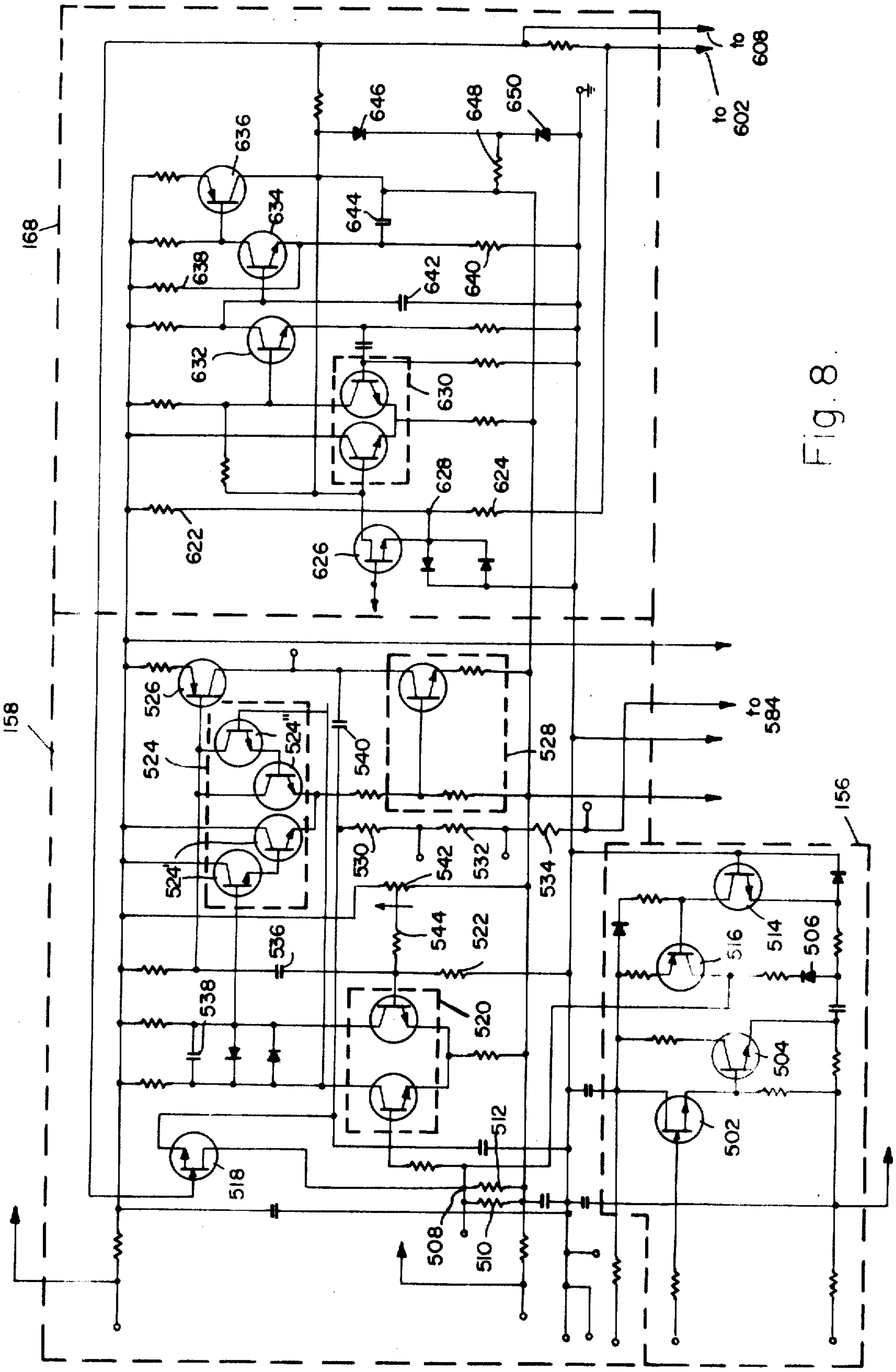
FIG. 8 is a circuit diagram of a Controlled Gain Amplifier, a Data Distributor and an AGC Integrator, useful in the present invention.

With reference to FIG. 8, the playback AGC Detector 156 input circuit utilizes a FET 502 connected in a source follower configuration. The output signal at the source of FET 502 is coupled into the base of emitter follower transistor 504. A positive going pulse from transistor 504 is passed through the conducting diode 506 to the junction 508 of resistors 510 and 512. The same pulse establishes a positive potential at the emitter of grounded base transistor 514, causing cut off. Absence of transistor 514 collector current, and therefore the lack of base drive to transistor 516 causes transistor 516 to be cut off. During the negative excursion of the signal from transistor 504, diode 506 is back biased and cut off. The negative potential at the emitter of transistor 514 allows conduction.

The negative going signal at the base of 516 is admitted through the base-collector junction of the now conducting transistor 516 and the resultant inverted signal at the collector of transistor 516 is transmitted to the junction 508 of resistors 510 and 512, establishing a rectified signal at that point. The signal is in opposition to, and is subtracted from, the negative level reflected through resistor 510 from the minus 12.5 volt reference supply. The error signal at the junction 508 is coupled through FET 518 to the input of the Attack and Release Amplifier 158. FET 518 is a variable resistance element that is controlled by the Gain Regulator Amplifier 168 output, which is described below.

The input stage of the Attack and Release Amplifier 158 is a dual matched pair transistor 520 operating in a differential configuration. The non-inverting input terminal to this differential input pair 520 is grounded through resistor 522. The inverting stage is the operational summing node of the Attack and Release Amplifier 158. The amplified error signal at the collectors of transistor pair 520 is coupled to the compounded Darlington configuration 524, formed by a pair of serially connected transistors to provide high current gain. The collectors of the first pair of transistors 524' are directly connected to the 12.5 volt line which is essentially signal ground. The output signal at the collectors of the second pair of transistors 524'' are coupled to inverting transistor 526. The output of the Attack and Release Amplifier 158 which is the collector of transistor 526, is connected to a constant current source 528. The output of the amplifier is also the point at which feedback resistors are connected into the circuit.

The Attack and Release amplifier 158 provides three bandwidth settings for the AGC loop: SLOW, by the selection of a first feedback resistor 530; MEDIUM, by selecting the second feedback resistor 532, or FAST, by selecting the third feedback resistor 534. Selection of bandwidth feedback resistors is controlled by a switch on the front panel (not shown).

Capacitor 536 is a minor feedback path and, together with capacitor 538, provides amplifier stability. Capacitor 540 provides integrating action and thereby filters the error signal from the AGC Detector 156. Potentiometer 542 and series resistor 544 provide capability to null the amplifier offset.

Figure 9:
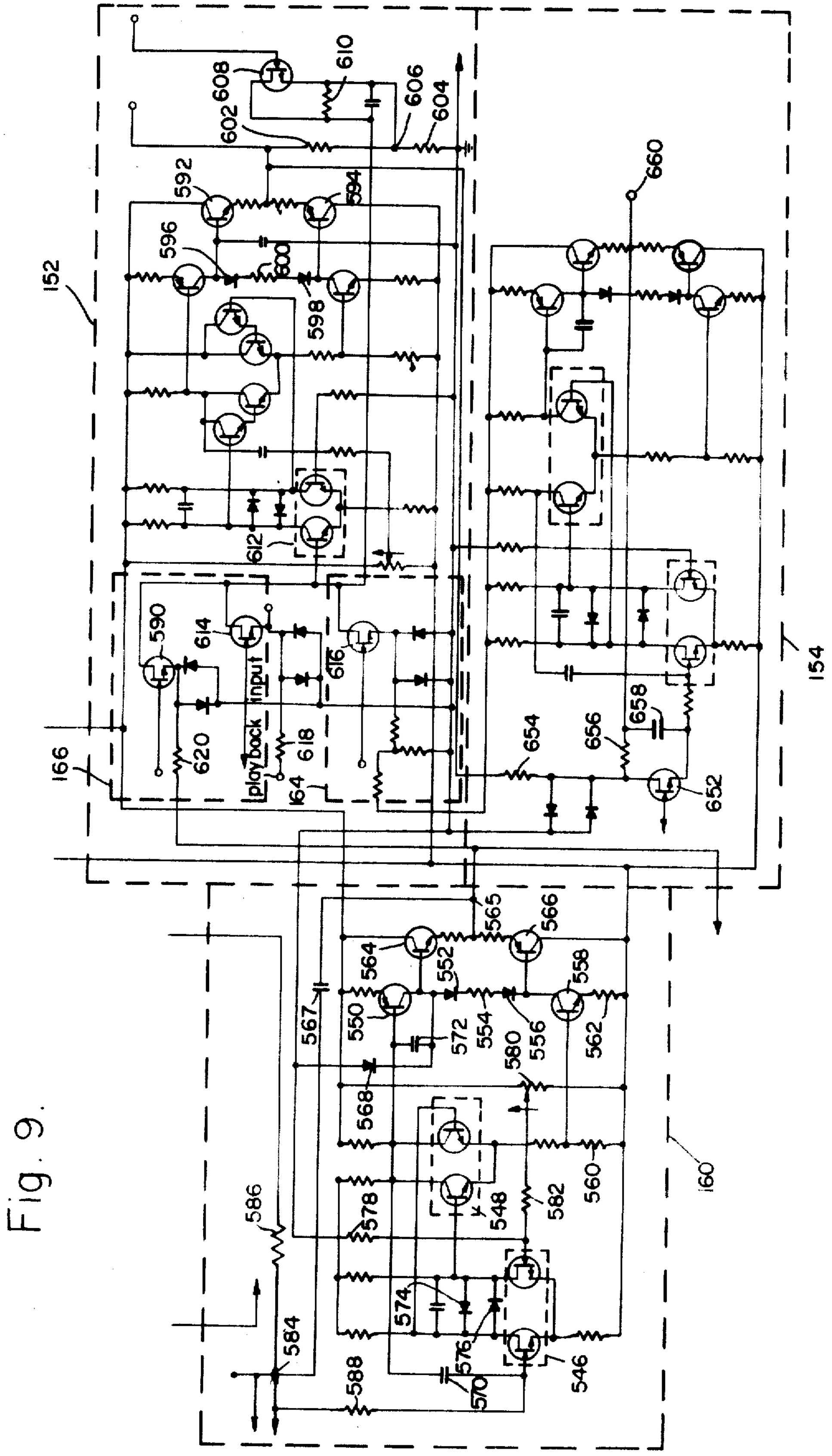
FIG. 9 is a circuit diagram of an AGC Detector, an Attack and Release Amplifier and a Gain Regulator useful in the present invention.

Output from the Attack and Release Amplifier 158 is coupled into the AGC Integrator 160, shown in FIG. 9, functioning in a classical, operational integrator configuration through the selected feedback resistor. The input stage to the AGC Integrator 160 amplifier consists of a dual matched pair FET 546 operating in differential configuration. The outputs from the drains of the input stage are coupled directly into dual matched transistor pair 548, also operating in a differential configuration. Amplified output from the collector of one of the transistors of the pair 548 is directly coupled into inverting transistor 550.

The collector of transistor 550 is coupled through diode 552, resistor 554, and diode 556 to a constant current source, consisting of transistor 558 and resistors 560 and 562. The output is then coupled into a complementary, emitter follower output stage consisting of transistors 564 and 566.

Diodes 552 and 556 and resistor 554 provide a forward bias current for the output stage transistors to prevent crossover distortion. Since the operation of the output of this integrator amplifier has a positive excursion only, diode 568 clamps the output of the collector of transistor 550 to prevent negative excursions.

Minor loop feedback is provided by capacitor 570 from the collectors of the transistors of the pair 548 to the gate of one of the FET Pair 546. Capacitor 572 also provides a feedback for proper stability. Clamp diodes 574 and 576 across the drain terminals of the input stage prevent saturation and instability in the event of sudden transient voltages.

The "in-phase" terminal, which is the gate of the other of the FET pair 546, is referenced to ground through resistor 578. Offset current for nulling the output of the amplifier is provided by potentiometer 580 and series resistor 582. The junction 584 of resistors 586 and 588 is the integrator summing node of this amplifier stage.

The input offset currents to this amplifier are very small due to the use of FET's. Since the gate is always operating reversed biased with respect to the source terminal, it is essential to maintain a very low offset current in this integrator stage for proper operation.

The output of the AGC Integrator 160 is taken from the junction 565 of the emitter followers of transistors 564 and 566, and is coupled to the input through an integrating capacitor 567.

Turning next to the Controlled Gain Amplifier 152, the error signal amplified by the Attack and Release and AGC Integrator Amplifiers, 158, 160, is coupled as D-C through FET 590 to the Controlled Gain Amplifier 152 The Controlled Gain Amplifier 152 operates in two modes; the Signal Amplification mode in which it operates as a conventional operational amplifier; and the Gain Adjustment mode. In the latter, gain is adjusted to provide a constant output level of −5.5 volts for any integrator output level which can range from plus 50 millivolts to plus 10 volts.

The amplifier circuit configuration is similar to that of the Attack and Release Amplifier 158, the exception being the complementary emitter follower output stage of transistors 592 and 594. Output crossover current bias is provided by diodes 596 and 598 and resistor 600. Resistors 602 and 604 form a 100:1 attentuator at the amplifier output.

The junction 606 of the attenuator resistors is coupled through the feedback path including FET switch 608 and resistor 610 back to the amplifier summing node which is the base of transistor pair 612. Gain of the amplifier is controlled by the resistance of FET 608 which varies as the gate voltage varies, the control voltage to which is supplied by the Gain Regulator Amplifier 168 output. Total amplifier gain ranges from 0.6 to 120.

Inputs are switched into the Controlled Gain Amplifier 152 via FET switches, 590, 614 and 616. In the Playback AGC mode of the operation, FET switch 614 is conducting and resistor 618 becomes the input resistor to the node of the operational amplifier. In the AGC mode of operation, switch 616 is held in a cutoff state. In the Playback Fixed Gain mode of operation, switches 616 and 614 are alternately turned on and off and switch 590 is held at cutoff.

Turning next to the Gain Regulator 168, shown in FIG. 8, during the gain correction period, the Controlled Gain Amplifier 152 D-C output is compared with a +12 volt reference voltage by summing resistors 622 and 624. FET switch 626 is conducting. The error, which exists at the junction 628 of resistors 622 and 624, is coupled into the Gain Regulator Amplifier which is operating in an integrator configuration. The error is amplified and is coupled to the gate of FET 608. The amplified error excursion direction causes the drain-to-source resistance of FET 608 to increase or decrease. This results in changing of the Controlled Gain Amplifier 152 gain until the output reaches the predetermined output level of −5.5 volts.

The input stage of the Gain Regulator 168 is the dual matched pair transistor 630. The output at the collector of one of the transistors of the pair 630 is coupled into cascaded inverting stages of transistors 632 and 634. The signal is then transferred to the base of output transistor 636. Emitter bias for transistor 634 is provided by the divider of resistors 638 and 640. Amplifier stability is provided by capacitors 642 and 644. Clamping diode 646 prevents the amplifier output from going more positive than the level established at the junction of resistor 648 and diode 650.

Returning to FIG. 9, the Data Distributor Amplifier 154 circuit configuration is similar to that of the AGC Integrator Amplifier 160. During the data sample period, switch FET 652 is in the conducting state. Input resistor 654 and feedback resistor 656 provide a gain in the stage of −1. Accordingly, the analog voltage from the Controlled Gain Amplifier 152 output is transferred to an integrating capacitor 658. When the data has been transferred onto the capacitor 648, FET switch 652 is cut off.

Low offset currents in the input stage permit the charge on integrating capacitor 658 to be maintained and therefore provides the analog signal at the amplifier output terminal 660. The integrating capacitor 658 holds the signal until the next data sample period, at which time the capacitor is updated with the new analog signal from the Controlled Gain Amplifier 152.

Figure 10:
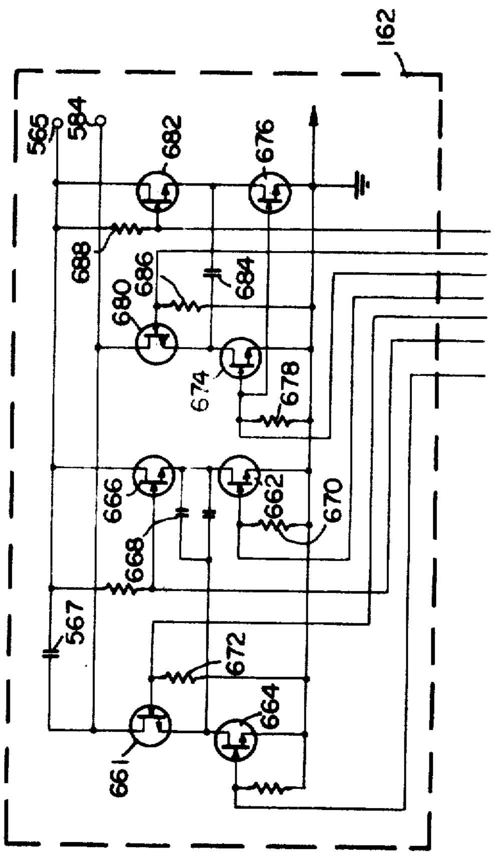
FIG. 10 is a circuit diagram of a ±6 db Gain Control circuit useful in conjunction with the AGC Integrator of FIG. 8, above.

Turning next to FIG. 10, the ±6 db correction circuits which control the AGC Integrator 160 in the normal state, gates of FET switches 661 and 662 are held at a negative potential and the switches are deactivated. FET switches 664 and 666 are energized.

The AGC Integrator output terminal 565 is coupled through switch 666, capacitor 668 and switch 664 to ground. The output potential of the AGC Integrator 160 therefore appears across capacitor 668 during this mode. When a −6 db reset command pulse is applied to the circuit, the gate potential at 664 and 666 is caused to go negative, thereby turning FETS 664 and 666 off. After a brief delay, the gate control circuit of switch 661 is opened. The gate of switch 662 is connected to ground through resistor 670. With both the gate and source of FET 662 at ground, the switch is activated. The drain of switch 661 is at ground potential by the connection to integrator input junction 584. With the gate grounded via resistor 672, switch 661 is activated.

The charge which existed across capacitor 668 is additionally transferred across integrating capacitor 567 which causes the output of the AGC Integrator 160 to double its voltage from the previous value. After a predetermined interval, switches 660 and 662 turn off. Immediately thereafter switches 664 and 666 turn on, preparing capacitor 668 for another −6 db Reset Command.

The plus 6 db Reset Switch is similar to the Minus 6 db Switch. In the normal state, FET switches 674 and 676, are conducting, their gates being commonly connected. The source terminals of 674 and 676 are at ground potential, and the gates are grounded through resistor 678. Switches 680 and 682 are cut off by a negative potential which is supplied to the gates of switches 680 and 682.

During this mode, capacitor 684 is grounded at both sides through the conducting switches 674 and 676.

A signal input to direct a +6 db increase cuts off switches 674 and 676. After a brief interval, the gate circuits to switches 680 and 682 are opened. The drain of switch 680 is conneced to the integrator input 584, which is at zero volts, and the gate is grounded through resistor 686 and switch 680 conducts. With resistor 688 connecting switch 682 drain to the gate, the switch turns on.

Capacitor 684 and the integrator capacitor 567 are of equal value. The charge stored on capacitor 567 transfers onto capacitor 684 until the voltage on both capacitors is one-half the original level on capactor 684. At the end of a predetermined interval, switches 680 and 682 are cut off. Shortly thereafter, switches 674 and 676 start conducting and capacitor 684 is prepared for the next +6 db Reset Command.

Thus, there has been shown and described an improved data acquisition system as applied to a seismic recording system and, more particularly, there has been described an improved correction loop for purposes of monitoring either detected signals or the playback of recorded signals.

As pointed out above, a signal is applied to the loop and is amplified in a controlled gain amplifier. The amplified signal is stored on a sample and hold capacitor while, at the same time, the data is applied through the input filters and through an AGC detector, which controls the overall gain of the loop. When the direct input signal is decoupled, the sample and hold capacitor provides an input until the next application of the input signal. Based upon the average energy content of the information, the AGC control loop modifies the gain of the controlled amplifier so that perturbations, representing information can be recovered from a highly attenuated signal.

In addition to the overall AGC control, on Playback, the digital signals representing changes in gain are utilized to either double or half the magnitude of the output of an AGC Integrator which controls the gain of the system. When an input data signal is not available, such as that portion of a scanning cycle when other, similar units are connected to the time-shared digital conversion portion of the system, the sample and hold capacitor is the source of the voltage controlling the gain of the loop.

On playback, therefore, amplification of the signal is maintained to keep the signal envelope substantially constant, so that the signal perturbations, representing information, can be clearly displayed.

What is claimed as new is:

1. Data display signal generating means adapted to respond to digital signals representing a scaling factor and analog signals representing magnitude of a previously received signal comprising:
   (a) amplifying means adapted to receive the analog signals for generating an output display signal;
   (b) gain control means connected to said amplifying means and adapted to receive output signals from said amplifying means and, the digital signals representing scaling factor for continuously adjusting the gain of said amplifying means to produce an output signal having an amplitude of substantially constant magnitude.

2. Apparatus of claim 1, above, wherein said amplifying means include gain regulator means alternatively connected to said amplifying means output and continuously operable in response to said amplifying means output for continuously adjusting the gain of said amplifying means to produce an output display signal of substantially constant predetermined magnitude.

3. Apparatus of claim 1, above, wherein said amplifying means include a feedback loop coupling said amplifying means output to said amplifying means input for maintaining the output signal level at a predetermined magnitude, said feedback loop including signal storage means selectively actuable to compare said amplifying means output with a preselected reference potential at a desired magnitude.

4. Apparatus of claim 1, above, further including a major feedback loop comprising filtering and buffering means connected between said amplifying means output and said amplifying means input for selectively transmitting signals within a predetermined frequency range.

5. Apparatus of claim 4, above, wherein said major feedback loop includes said gain control means, said gain control means including signal detector means connected to receive said filtering and buffering means output signals, said signal detector means providing an output to control said amplifying means gain in accordance with the energy content of said filtering and buffering means output signals.

6. Apparatus of claim 4, above, wherein said major feedback loop includes amplifying means having selectively adjustable bandwidth characteristics corresponding to anticipated input signal envelope characteristics.

7. Apparatus of claim 1, wherein said gain control means include:
   (a) integrator amplifying means connected to receive output signals from said amplifying means and
   (b) minor feedback loop means connected between said integrator amplifying means output and input; said minor feedback loop means being connected to receive the digita signals representing a scaling factor, said minor feedback loop means being operable in response to first and second binary valued signals for increasing and decreasing, by a predetermined factor, the gain of said integrator amplifying means to change the magnitude of the gain control signal being applied by said integrator amplifying means output to said amplifying means.

8. In combination with a data acquisition system having means responsive to analog input data for recording the analog data in digital form including magnitude bits and scaling factor bits, and including digital to analog conversion means for converting the recorded magnitude bits into an analog output signal, output means for generating an analog display record representative of recorded digital data corresponding to the analog input data comprising:

(a) controlled gain amplifier means connected to receive the analog output signal for providing an output display signal having a substantially constant level output signal;

(b) signal compensating means connected to said controlled gain amplifier means and connected to receive the recorded digital scaling factor bits and the analog output signal, said signal compensating means being operable in response to first and second valued scaling factor bits to increase and decrease, respectively, by a predetermined factor, the magnitude of the signal being applied to said controlled gain amplifier means, whereby discontinuous changes in the analog signal derived from the magnitude bits are corrected and compensated for by the contemporaneous corresponding change of scale represented by the scaling factor bits to provide a substantially continuous analog output signal having a substantially constant level signal.

9. Apparatus of claim 8, above, wherein the analog output signals are periodically applied for limited intervals; said output means further including:

(a) signal storage means for retaining the output display signal between successive applications of the analog output signal;

(b) switching means operable in a first configuration to connect said controlled gain amplifying means between the applied analog signal and said signal storage means, and to disconnect said signal compensating means from the input of said controlled gain amplifying means, said switching means being operable in a second configuration to disconnect the output of said controlled gain amplifier means from said signal storage means and to connect the input of said controlled gain amplifying means to receive the output of said signal compensating means whereby gain changes can be compensated for between successive applications of the analog signal without introducing discontinuities in the output.

10. Apparatus as in claim 8, above, wherein said controlled gain amplifier means are alternatively operable in a first mode to amplify applied analog output signals and operable in a second mode, in the absence of applied analog output signals, to modify the gain of said controlled gain amplifier means in accordance with the magnitude of the output display signal generated in the next prior first mode operation and in accordance with reference signals of predetermined magnitude, to maintain a substantially constant level output signal.

11. The combination with a data acquisition system in which applied analog signals are recorded in digital form represented by magnitude bits and scaling factor bits, the system having digital to analog signal conversion means for converting the magnitude bits to corresponding analog signals, of means for compensating for gain changes in analog output display signals corresponding to the recorded scaling factor bits comprising:

(a) integrator amplifier means having an input and an output and adapted to receive and amplify the applied analog signals;

(b) gain controlling feedback loop means intercoupling said input and output; and (c) signal compensation means connected to said gain controlling feedback loop means and adapted to receive the scaling factor bits for changing, by a predetermined factor, the gain of said integrator amplifier in response to applied scaling factor bits representing a change in scale, whereby successive digital signals corresponding to successive samples of data can, by appropriate changes of gain, provide a substantially continuous output despite intervening apparent discontinuities resulting from changes in scale during recording.

References Cited

UNITED STATES PATENTS

| | | | |
|---|---|---|---|
| 3,034,041 | 5/1962 | Schuster | 328—175 XR |
| 3,172,045 | 3/1965 | Thaler | 328—175 XR |
| 3,241,100 | 3/1966 | Loofbourrow | 340—15.5 |
| 3,345,608 | 10/1967 | Brown et al. | 340—172.5 |
| 3,376,557 | 4/1968 | Godinez | 340—172.5 |

PAUL J. HENON, Primary Examiner

H. E. SPRINGBORN, Assistant Examiner